(12) United States Patent
Choi et al.

(10) Patent No.: US 6,733,897 B2
(45) Date of Patent: May 11, 2004

(54) DIELECTRIC COMPOSITION AND MULTILAYER CERAMIC CONDENSER USING THE SAME

(75) Inventors: Chang Hak Choi, Seoul (KR); Kang Heon Hur, Suwon (KR); Chang Ho Lee, Suwon (KR); Hee Young Son, Yongin (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/443,745

(22) Filed: May 23, 2003

(65) Prior Publication Data

US 2003/0224153 A1 Dec. 4, 2003

(30) Foreign Application Priority Data

May 24, 2002 (KR) ........................... 2002-28880

(51) Int. Cl.⁷ ..................... H01G 4/06; C04B 35/468
(52) U.S. Cl. ................. 428/472; 428/471; 428/697; 428/702; 501/136; 501/137; 361/321.4; 361/321.5
(58) Field of Search ................. 428/469, 472, 428/471, 697, 702; 501/136, 137; 361/311, 321.1, 321.2, 321.4, 321.5

(56) References Cited

U.S. PATENT DOCUMENTS 5,181,157 A * 1/1993 Chazono et al. ......... 361/321.5
5,184,277 A * 2/1993 Shizuno et al. .......... 361/321.5
6,458,734 B1 * 10/2002 Sugimoto et al. ........... 501/139

FOREIGN PATENT DOCUMENTS

JP     2000-243652     9/2000

* cited by examiner

Primary Examiner—Stephen Stein
(74) Attorney, Agent, or Firm—Lowe Hauptman Gilman & Berner LLP

(57) ABSTRACT

A dielectric compound for a multilayer ceramic condenser having a low sintering temperature and a high dielectric constant includes a base material of $(Ba_xCa_{1-x})m(Ti_yZr_{1-y})O_3$ (where $0.7 \leq x \leq 1$, $0.75 \leq y \leq 0.9$, $0.998 \leq m \leq 1.006$), an additive including $MnO_2$ of less than 0.8 weight %, $Y_2O_3$ of less than 0.8 weight %, $V_2O_5$ of 0~0.1 weight %, and a sintering aid of $zLi_2O-2(1-z)SiO_2$ ($0.2 \leq z \leq 0.9$) of less than 1.0 weight %. The weight % is a ratio relating to a weight of base material of the dielectric compound.

6 Claims, No Drawings

DIELECTRIC COMPOSITION AND MULTILAYER CERAMIC CONDENSER USING THE SAME

CROSS-REFERENCE TO RELATED APPLICATION

This application claims priority to Korean patent Application No. 2002-28880 filed May 24, 2002.

BACKGROUND OF THE INVENTION

1. Field of the Invention

The present invention relates to a dielectric composition for a multilayer ceramic condenser and a multi-layer ceramic condenser using the same, and more particularly, to a multi-layer ceramic condenser made of dielectric composition to be sintered at low temperatures and have a high dielectric constant.

2. Description of the Related Art

A multi-layer ceramic condenser requires a high dielectric constant in response to demands of a minimized size and a high capacitance. Therefore, a new dielectric ceramic composition is needed to meet these demands.

The new dielectric ceramic composition must have a high dielectric constant to be used for making the multi-layer ceramic condenser to meet a temperature characteristic of Y5V, one of U.S. industrial standards, and the multi-layer ceramic condenser has been used in a circuit at which capacitance is high, and dependency of electrostatic capacitance on temperature change is not important.

One of conventional dielectric compositions used for the multi-layer ceramic condenser having the characteristic of Y5V is disclosed in a Japanese patent publication No. 2000-243652. The Japanese patent publication describes the dielectric composition with the following formula 1.

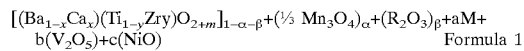

wherein, $1.00 \leq m \leq 1.02$, $0.001 \leq x \leq 0.05$, $0.05 \leq y \leq 0.2$, $0.001 < \alpha \leq 0.015$, $0.001 \leq \beta \leq 13 < 0.015$, $0.01 \leq a \leq 0.5$, $0 \leq b \leq 0.1$, $0 \leq c \leq 0.2$, M is BaO-Al2O3-SiO2-based glass, R is Y or Dy.

Thought the above described dielectric composition has a stable electrostatic capacitance and a high dielectric constant in the range of usage temperature of Y5V, a Ni terminal is disconnected from a condenser body and the size of the grain particles increase because the multi-layer ceramic condenser is sintered at a high temperature of about 1300° C. through 1350° C., As a result, the multi-layer ceramic condenser cannot have a desired reliability and a high dielectric constant.

SUMMERY OF THE INVENTION

In order to overcome the above and other problems, the present invention has an object to provide a dielectric compound for a multi-layer ceramic condenser having a low sintering temperature and a high dielectric constant.

It is another object of the present invention to provide a multi-layer ceramic condenser having an excellent dielectric breakdown voltage characteristic and a high capacitance with a low rate of disconnection of a terminal and a crack after sintering by using a dielectric compound having a high dielectric constant and being sintered at a relatively low temperature.

Additional objects and advantages of the invention will be set forth in part in the description which follows and, in part, will be obvious from the description, or may be learned by practice of the invention.

The above and other objects according to an embodiment of the present invention, may be achieved by providing a dielectric composition comprising: $(Ba_xCa_{1-x})_m(Ti_yZr_{1-y})O_3$, wherein $0.7 \leq x \leq 1$, $0.75 < y \leq 0.9$, $0.998 \leq m \leq 1.006$, as a base material; $MnO_2$ of less than about 0.8 weight %, $Y_2O_3$ of less than 0.8 weight %, $V_2O_5$ of 0~0.1 weight % base on a weight of the base material as a additive; and $zLi_2O$-$2(1-z)SiO_2$ of less than about 1.0 weight %, wherein, $0.2 \leq z \leq 0.9$, as a sintering aid. The weight % is a ratio relating to a weight of base material of the dielectric compound.

According to another aspect to the present invention, a multi-layer ceramic condenser has a ceramic layer made of the dielectric compound, and an internal terminal made of Ni.

DETAILED DESCRIPTION OF THE INVENTION

According to an embodiment of the present invention, there provides a dielectric composition for a multi-layer ceramic condenser, comprising $(Ba_xCa_{1-x})_m(Ti_yZr_{1-y})O_3$, wherein $0.7 \leq x \leq 1$, $0.75 \leq y \leq 0.9$, $0.998 \leq m \leq 1.006$, as a base material, a additive and a sintering aid. The dielectric composition of the present invention can be sintered at a low temperature and has a high dielectric constant.

Since the dielectric compound is sintered at the low temperature less than about 1300° C. and has a high dielectric capacitance, a phenomenon of a disconnection and crack of a Ni terminal is reduced, and the dielectric compound can be used for making a thin multi-layer dielectric condenser having a high strength and a stable reliability.

The base material of the dielectric compound of the present invention is $(Ba_xCa_{1-x})_m(Ti_yZr_{1-y})O_3$, wherein $0.7 \leq x \leq 1$, $0.75 \leq y \leq 0.9$, $0.998 \leq m \leq 1.006$, as described above. The x, y, and m are determined in accordance with the dielectric constant, a grain growth, an insulation resistance characteristic, etc. If the x, y, and m of the dielectric compound are not within the above respective ranges, the dielectric constant is reduced, the grain abnormally grows, and the insulation resistance is reduced. It is preferable that $0.99 \leq x \leq 1$, $0.80 \leq y \leq 0.84$, and $1.001 \leq m \leq 1.004$.

The dielectric composition of the present invention further comprises $MnO_2$ of less than about 0.8 weight %, $Y_2O_3$ of less than 0.8 weight %, $V_2O_5$ of 0~0.1 weight % base on a weight of the base material as a additive, and $zLi_2O$-$2(1-z)SiO_2$ of less than about 1.0 weight %, wherein, $0.2 \leq z \leq 0.9$, as a sintering aid. The above described base material, the additive, and the sintering aid are mixed up.

$MnO_2$, $Y_2O_3$, $V_2O_5$ of the additive are component materials to be added to improve the dielectric constant. If the amount of the additive is excessively added to the dielectric compound, the dielectric constant decreases, and the insulation resistance is reduced.

$V_2O_5$ is added if necessary, and acts as a donor to improve the dielectric constant, promote a sintering process, and lower the sintering temperature.

Considering the function of the above mentioned factors, the amount of $MnO_2$ is less than 0.8 weight %, preferably 0.05~0.8 weight %, the amount of $Y_2O_3$ is less than 0.8 weight %, preferably 0.05~0.8 weight %, and the amount of $V_2O_5$ is about 0~0.1 weight %, preferably 0.05~0.1 weight %.

The sintering aid, $zLi_2O\text{-}2(1\text{-}z)SiO_2$ ($0.2 \leq z \leq 0.9$), is added as a component material lowering the sintering temperature. The amount of the sintering aid is about less than 1.0 weight %, preferably 0.1–0.5 weight % based on the weight of the base material.

If the amount of the sintering aid is excessively added and exceeds 1.0 weight % based on the weight of the base material, the grain grows an over-sized grain due to the excessive addition, and a sintering density is lowered due to the over-sized grown grain. As a result, the dielectric constant is reduced. Thus, the amount of the sintering aid should be limited to less than 1.0 weight %, preferably 0.1~0.5 weight %. If the amount of the sintering aid is 0.1~0.5 weight %, the dielectric constant becomes relatively high.

The sintering aid includes a glass phase or a crystal phase having a predetermined portion of the glass phase, or a crystal phase.

The dielectric compound of the present invention has the dielectric constant of more than 15000, and has sintering temperatures from 1000° C. to 1200° C. Accordingly, it is possible to manufacture a thin multilayer ceramic condenser with a high capacitance having the dielectric compound of the present invention as ceramic layer and having the Ni as an internal terminal.

The multilayer ceramic condenser having the ceramic layer made of the dielectric compound of the present invention has an electrostatic capacitance changing rate within 22%–82% at a temperature range of −25° C.~+85° C., which meets the requirement of Y5V regarding a ceramic condenser.

A process of manufacturing the dielectric compound for the multilayer ceramic condenser will be described hereinafter.

The process of manufacturing the dielectric compound for the multilayer ceramic condenser is not limited to but can be used to a manufacturing process of other compound for the related industrial field.

According to an embodiment of the present invention, the process of manufacturing the dielectric compound for the multilayer ceramic condenser is explained.

A base raw material is crashed, mixed, and calcined to make base material powder of the base material of the dielectric compound.

When the base material, $(Ba_xCa_{1-x})_m(Ti_yZr_{1-y})O_3$, (hereinafter referred to as BCTZ), wherein $0.7 \leq x \leq 1$, $0.75 \leq y \leq 0.9$, $0.998 < m < 1.006$ is crashed and mixed, it is preferable to make the mean diameter of the base material 0.3~0.8 µm by using a ball mill or bead mill.

It is preferable to heat the mixed base material powder at a rising temperature rate of 2–5° C./Min., and followed by calcination at 1100° C.–1160° C. for 1–3 hours.

A ratio A/B of the calcined base material powder can be controlled by a quantitative analysis using of an X ray fluorescent analyzer (XRF).

The base material powder is mixed with the sintering aid and the additive including $MnO_2$, $Y_2O_3$ and $V_2O_5$, then be formed and sintered in order to manufacture the dielectric compound of the present invention for the multi-layer ceramic condenser.

The sintering aid is crashed to have a diameter of less than 2 µm, preferably 1–1.5 µm, then preferably mixed with the base material powder.

To produce the dielectric compound having a high dielectric constant and stable characteristics (preventing from being deformed or grown to an abnormal grain), the diameter of the sintering aid should be less than 2 µm.

If the diameter of the sintering aid is more than 2 µm, the glass phase grows the abnormal grain due to an unbalanced formation of a partially melted glass during the sintering process. As a result, the dielectric constant is reduced, and a glass component is partially formed on a surface of the sintered compound due to extraction of the glass phase.

The sintering aid is mixed in the form of either a glass phase or a crystal phase including a partial glass phase. Mixing the sintering aid in the form of glass makes it easier to control the grain to have the diameter of 2–3 µm than mixing the sintering aid in the form of crystal phase, and is appropriate for manufacturing a very thin multi-layer ceramic condenser having a high dielectric constant.

The sintering temperature of the sintering process is preferably 1000° C.–1200° C., an environment of the the sintering process is in the presence of hydrogen for 1–3 hours.

The embodiment of the present invention is explained in more detail.

Embodiment 1

The base material BCTZ (x:0.99, y:0.83, m:1.0025), the additive having $MnO_2$, $Y_2O_3$ and $V_2O_5$, and the sintering aid of $zLi_2O\text{-}2(1\text{-}z)SiO_2$ ($0.2 \leq z \leq 0.9$) are mixed according to respective amounts as shown in a table 1, and sintered for 2 hours at the sintering temperature as shown in the table 1 to form the dielectric compound.

Using ethanol as a solvent together with Zirconia ball, the additive are wet-mixed up and first crashed to have an average diameter of 0.4–0.7 µm.

The Li—Si-based sintering aid having the diameter of 1.0–1.5 µm is used.

When the base material is mixed with the additive and the sintering aid to form a compound mixture, the compound mixture is dried out.

The compound mixture is mixed with an organic solvent, a binder such as a PVB binder, and a dispersion agent (dispersant) are mixed up together with the Zirconia ball by using the ball mill method, and a slurry, the resultant of the above mixing, is filtered using a texture having 200 mesh. And after aging for 24 hours, the resultant formed a layer having 20 µm, laminated to have a thickness of 1 mm, and pressed for one minute at 140° C. After performing a cool isostatic press (CIP) process with a weight of 1000 kgf for 15 minutes, the resultant is cut out to obtain standard test samples to test the dielectric characteristics of the dielectric compound. The standard test samples is heated at 200–350° C., burned up binder, sintered for two hours at the sintering temperature of table 1 under sintering temperature atmosphere with the present of hydrogen using a tunnel or tube furnace, and tested to obtain the dielectric constant, the dielectric loss, and the insulation resistance. The test results are shown in table 1 as follows.

TABLE 1

| TEST SAMPLE No. | MnO$_2$ (Weight %) | Y$_2$O$_3$ (Weight %) | V$_2$O$_5$ (Weight %) | Sinter Additive (Weight %) | z | Sintering Temp (° C.) | dielectric constant | DF (%) | Insulation Resistance (Ω) |
|---|---|---|---|---|---|---|---|---|---|
| 1 | 0.2 | 0.3 | 0.03 | 0.1 | 0.8 | 1100 | 19000 | 0.8 | 3E11 |
| 2 | 0.2 | 0.3 | 0.03 | 0.3 | 0.8 | 1100 | 18000 | 1.1 | E11 |
| 3 | 0.2 | 0.3 | 0.03 | 1.0 | 0.8 | 1100 | 14000 | 1.4 | 4E11 |
| 4 | 0.2 | 0.3 | — | 0.3 | 0.8 | 1100 | 13000 | 0.9 | 2E11 |
| 5 | 0.3 | 0.2 | 0.05 | 0.1 | 0.8 | 1100 | 18000 | 1.2 | 5E11 |
| 6 | 0.3 | 0.2 | 0.05 | 0.3 | 0.8 | 1100 | 17000 | 0.8 | 6E11 |
| 7 | 0.3 | 0.2 | 0.05 | 1.0 | 0.8 | 1100 | 10000 | 0.6 | 3E11 |
| 8 | 0.3 | 0.2 | — | 0.3 | 0.8 | 1150 | 8000 | 0.8 | 3E11 |
| 9 | 0.2 | 0.3 | 0.03 | 0.3 | 0.8 | 1150 | 21000 | 0.7 | 6E10 |
| 10 | 0.2 | 0.3 | 0.03 | 0.1 | 0.67 | 1100 | 15000 | 1.0 | 3E12 |
| 11 | 0.2 | 0.3 | 0.03 | 0.3 | 0.67 | 1100 | 18000 | 0.7 | 5E11 |
| 12 | 0.2 | 0.3 | 0.03 | 1.0 | 0.57 | 1100 | 7000 | 0.8 | 7E10 |
| 13 | 0.2 | 0.3 | — | 0.3 | 0.67 | 1100 | 13000 | 0.9 | 1E11 |
| 14 | 0.3 | 0.2 | 0.05 | 0.1 | 0.67 | 1100 | 12000 | 0.5 | 3E11 |
| 15 | 0.3 | 0.2 | 0.05 | 0.3 | 0.67 | 1100 | 10000 | 0.5 | 2E11 |
| 16 | 0.3 | 0.2 | 0.05 | 1.0 | 0.67 | 1100 | 5000 | 0.6 | 9E10 |
| 17 | 0.2 | 0.3 | 0.03 | 0.3 | 0.67 | 1150 | 20000 | 0.7 | 6E10 |
| 18 | 0.2 | 0.3 | 0.03 | 0.1 | 0.5 | 1100 | 14000 | 0.7 | 1E12 |
| 19 | 0.2 | 0.3 | 0.03 | 0.3 | 0.5 | 1100 | 17000 | 0.6 | 5E11 |
| 20 | 0.2 | 0.3 | 0.03 | 1.0 | 0.5 | 1150 | 12000 | 1.1 | 4E11 |
| 21 | 0.2 | 0.3 | 0.03 | 0.3 | 0.5 | 1100 | 10000 | 0.8 | 3E11 |
| 22 | 0.2 | 0.4 | — | 0.1 | 0.5 | 1100 | 8000 | 0.4 | 2E11 |
| 23 | 0.3 | 0.2 | 0.05 | 0.1 | 0.5 | 1100 | 12000 | 0.4 | 3E11 |
| 24 | 0.3 | 0.2 | 0.05 | 0.3 | 0.5 | 1100 | 13000 | 0.4 | 2E11 |
| 25 | 0.3 | 0.2 | 0.05 | 1.0 | 0.5 | 1100 | 7000 | 0.5 | 9E11 |
| 26 | 0.2 | 0.3 | 0.03 | 0.3 | 0.5 | 1150 | 17000 | 0.6 | 6E11 |
| 27 | 0.2 | 0.4 | — | 0.3 | 0.5 | 1100 | 13000 | 0.5 | 5E11 |
| 28 | 0.2 | 0.4 | — | 0.7 | 0.5 | 1100 | 11000 | 0.7 | 5E11 |

As shown in table 1, depending on addition of V$_2$O$_5$, the amount of growth of the grain varies, and this causes the dielectric constant to be changed. According to this embodiment of the present invention, V$_2$O$_5$ acts as the donor to accelerate the sintering.

As the amount of the sintering aid excessively increases, the sintering density decreases, and the dielectric constant is reduced.

Embodiment 2

The base material BCTZ (x:0.99, y:0.83, m:1.0025), the additive haivng MnO$_2$, Y$_2$O$_3$ and V$_2$O$_5$, and the sintering aid of zLi$_2$O-2(1−z)SiO$_2$ (0.2≦z≦0.9) are mixed according to respective amounts as shown in a table 2, and sintered for 2 hours at the sintering temperature as shown in the table 2 to form the dielectric compound.

The size of particles of the sintering aid is changed according to table 2.

The sintered test samples are tested to obtain the dielectric constant, the dielectric loss, and the insulation resistance as shown in table 2.

As shown in table 2, the test samples 29 and 32 marked with * includes the abnormally grown grain. When the particle size of sintering aid is 1.0 μm, the dielectric constant becomes high, and the uniformed minute structure is obtained with a relatively small number of the abnormally grown grain.

Embodiment 3

A laminate including the dielectric compound according to table 3 and a Ni electrode is formed on a forming sheet having a thickness of 4–7 μm and then simultaneously sintered at a temperature of 1000–1100° C. in a reducing atmosphere. After coating with an Cu external electrode, the multilayer ceramic condenser is manufactured by heat-treatment at a temperature of 700–800° C.

The base material of this embodiment uses the same material as table 1. The sintered test samples are tested to obtain the dielectric constant, the dielectric loss, and the insulation resistance as shown in table 3.

TABLE 2

| Test Sample No. | MnO$_2$ (Weight %) | Y$_2$O$_3$ (Weight %) | V$_2$O$_5$ (Weight %) | Sinter Additive (Weight %) | z | Glass Particle (μm) | Sinter Temp (° C.) | dielectric constant | DF (%) | Insulation Resistance (Ω) | Size of Grain Particle (μm) |
|---|---|---|---|---|---|---|---|---|---|---|---|
| 29 | 0.2 | 0.3 | 0.03 | 0.3 | 0.5 | 3.5 | 1100 | 8000 | 0.8 | 2E12 | 0.69* |
| 30 | 0.2 | 0.3 | 0.03 | 0.3 | 0.5 | 2.5 | 1100 | 15000 | 0.6 | 4E11 | 2.49 |
| 31 | 0.2 | 0.3 | 0.03 | 0.3 | 0.5 | 1.0 | 1100 | 17000 | 0.6 | 4E11 | 3.27 |
| 32 | 0.2 | 0.35 | 0 | 0.3 | 0.5 | 3.5 | 1100 | 5000 | 0.5 | 6E12 | 1.18* |
| 33 | 0.2 | 0.35 | 0 | 0.3 | 0.5 | 2.5 | 1100 | 11000 | 0.5 | 5E11 | 2.72 |
| 34 | 0.2 | 0.35 | 0 | 0.3 | 0.5 | 1.0 | 1100 | 13000 | 0.4 | 5E11 | 2.16 |

TABLE 3

| Test Sample No. | MnO$_2$ (Weight %) | Y$_2$O$_3$ (Weight %) | V$_2$O$_5$ (Weight %) | Sinter additive (Weight %) | z | Sinter Temp (°C.) | CP ($\mu$F) | DF (%) | Insulation Resistance ($\Omega$) | Test Product Name |
|---|---|---|---|---|---|---|---|---|---|---|
| 35 | 0.2 | 0.3 | 0.03 | 0.3 | 0.5 | 1000 | 1.034 | 11.1 | 6E9 | 05F105ZRN |
| 36 | 0.2 | 0.3 | 0.03 | 0.3 | 0.5 | 1000 | 2.935 | 12.0 | 5E10 | 1F225ZQN |
| 37 | 0.2 | 0.3 | 0.03 | 0.3 | 0.5 | 1000 | 11.42 | 11.4 | 1E10 | 21F106ZQN |
| 38 | 0.2 | 0.3 | 0.03 | 0.3 | 0.5 | 1100 | 1.130 | 11.3 | 6E9 | 05F105ZRN |
| 39 | 0.2 | 0.3 | 0.03 | 0.3 | 0.5 | 1100 | 3.065 | 11.9 | 5E10 | 1F225ZQN |
| 40 | 0.2 | 0.3 | 0.03 | 0.3 | 0.5 | 1100 | 11.52 | 11.8 | 1E10 | 21F106ZQN |

As shown in table 3, the test samples 35 and 38 show a good result in capacitance (CP), Dielectric Loss (DF), and the insulation resistance. Therefore, the test sample may be used in the test product 05F105ZRN, which includes the internal electrode Ni layer and the dielectric layer having 90 layers each having a thickness of 4 $\mu$m. The capacitance, the DF, and the insulation resistance of the test product 05F105ZRN are more than 1.0 $\mu$F, less than 18%, more than 1E8Q, respectively.

The test samples 36 and 39 can be used in the test product 1F225ZQN, which includes the internal electrode layer and the dielectric layer having 100 layers each having a thickness of 6 $\mu$m. The capacitance, the DF, and the insulation resistance of the test product 1F225ZQN are more than 2.2 $\mu$F, less than 16%, more than 5E7$\omega$, respectively.

The test samples 37 and 40 can be used in the test product 21F106ZQN, which includes the internal electrode layer and the dielectric layer having 200 layers each having a thickness of 5.5 $\mu$m. The capacitance, the DF, and the insulation resistance of the test product 21F106ZQN are more than 10 $\mu$F, less than 16%, more than 1E7$\omega$, respectively.

According to table 3, even if the sintering temperature is low, the disconnection problem of the internal electrode Ni layer is reduced, and the grain is also reduced in size. Moreover, the capacitance increases.

As the sintering temperature is lowered, an internal crack is reduced due to a strengthened ceramic body of the multilayer ceramic condenser by reducing a difference between contraction coefficients of adjacent internal electrode layers.

According to the conventional mutilayer ceramic condenser as disclosed in Japanese patent publication 2000-243652, if a super slim (very thin) and small-sized multilayer ceramic condenser is made of the conventional dielectric compound sintered at a high temperature of 1350° C., a circuit short occurs since the electrode layer has the same thickness as the dielectric layers due to a decrease of a forming thickness. Moreover, the disconnection of the electrode occurs, and a dielectric breakdown voltage characteristic is lowered. Therefore, the conventional dielectric compound for the conventional multilayer ceramic condenser may not be used for manufacturing the super slim (very thin) and small-sized multilayer ceramic condenser to meet the recent demands of the condenser in size, capacitance, reliability, durability.

On the contrary, the dielectric compound according to the embodiment of the present invention, can be used for manufacturing the very thin multilayer ceramic condenser having a dielectric layer having a thickness of about 2–3 $\mu$m, a high dielectric constant, and a low sintering temperature.

Furthermore, the very thin multilayer ceramic condenser made of the dielectric compound shows the excellent reliability and electric characteristic.

As described above, the dielectric compound according to the embodiment of the present invention, is sintered at a low sintering temperature by 100–300° C., has a minute fine structure to increase the dielectric constant, can be used in the very thin multilayer ceramic condenser because the size of the grain can be controlled, and improve the a dielectric breakdown voltage characteristic.

In addition, since a mismatching between the internal Ni electrode layers is reduced even when the electrode layer and the ceramic layer are simultaneously sintered, the multilayer ceramic condenser can have a desired ceramic body having the high strength, the high reliability, the excellent dielectric breakdown voltage characteristic, and the high capacitance. The dielectric compound can be used for manufacturing a super capacitance and very thin multilayer ceramic condenser.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A dielectric composition for a multi-layer ceramic condenser, comprising:
   (Ba$_x$Ca$_{1-x}$)$_m$(Ti$_y$Zr$_{1-y}$)O$_3$, wherein 0.7≦x≦1, 0.75≦y≦0.9, 0.998≦m≦1.006, as a base material;
   MnO$_2$ of less than about 0.8 weight %, Y$_2$O$_3$ of less than 0.8 weight %, V$_2$O$_5$ of 0~0.1 weight % base on a weight of the base material as a additive; and
   zLi$_2$O-2(1-z)SiO$_2$ of less than about 1.0 weight %, wherein, 0.2≦z≦0.9, as a sintering aid.

2. The dielectric composition of claim 1, wherein dielectric constant of the dielectric composition is more than 15000.

3. The dielectric composition of claim 1, wherein the base material, the additive, and the sintering aid are sintered to the multilayer ceramic condenser at a temperature of between 1000° C. and 1200° C. inclusive.

4. The dielectric composition of claim 1, wherein the sintering aid is crashed to particles having a diameter of less than 2 $\mu$m.

5. A multilayer ceramic condenser, comprising:
   an internal electrode made of Ni; and
   a ceramic body including a plurality of layers made of a dielectric compound having 1) (Ba$_x$Ca$_{1-x}$)$_m$(Ti$_y$Zr$_{1-y}$)O$_3$, wherein 0.7≦x≦1, 0.75≦y≦0.9, 0.998≦m≦1.006, as a base material, 2) MnO$_2$ of less than about 0.8 weight %, Y$_2$O$_3$ of less than 0.8 weight %, V$_2$O$_5$ of 0~0.1 weight % base on a weight of the base material as a additive, and 3) zLi$_2$O-2(1-z)SiO$_2$ of less than about 1.0 weight %, wherein, 0.2≦z≦0.9, as a sintering aid.

6. The condenser of claim 5, wherein the multilayer ceramic condenser has an electrostatic capacitance changing rate between +22% and −82% at the temperature range of −25° C. to +85° C.

* * * * *